United States Patent
Kawai et al.

(10) Patent No.: US 12,238,254 B2
(45) Date of Patent: Feb. 25, 2025

(54) FILE PROVISION SYSTEM, FILE GENERATION APPARATUS, AND FILE PROVISION METHOD

(71) Applicant: PFU LIMITED, Ishikawa (JP)

(72) Inventors: Yuichi Kawai, Ishikawa (JP); Hisamichi Kobayashi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 18/318,529

(22) Filed: May 16, 2023

(65) Prior Publication Data

US 2023/0396723 A1 Dec. 7, 2023

(30) Foreign Application Priority Data

Jun. 2, 2022 (JP) ................................ 2022-090077

(51) Int. Cl.
*H04N 1/44* (2006.01)
*H04N 1/00* (2006.01)
*H04N 1/32* (2006.01)

(52) U.S. Cl.
CPC ....... *H04N 1/4413* (2013.01); *H04N 1/00209* (2013.01); *H04N 1/00482* (2013.01);
(Continued)

(58) Field of Classification Search
CPC ............. H04N 1/4413; H04N 1/00209; H04N 1/00482; H04N 1/32106; H04N 1/444; H04N 2201/3269; H04N 2201/3273
See application file for complete search history.

(56) References Cited

U.S. PATENT DOCUMENTS

| | | | |
|---|---|---|---|
| 6,735,665 B1 | 5/2004 | Kumangai et al. | |
| 11,516,353 B2 | 11/2022 | Hanano | |
| 2009/0282001 A1* | 11/2009 | Fukuda | H04H 60/32 |
| 2012/0140275 A1* | 6/2012 | Fukuda | H04N 1/00228 |
| | | | 358/1.15 |

(Continued)

FOREIGN PATENT DOCUMENTS

| | | | |
|---|---|---|---|
| JP | 2001-036701 A | 2/2001 | |
| JP | 2004-086731 A | 3/2004 | |

(Continued)

OTHER PUBLICATIONS

International Search Report received in International Application No. PCT/JP2021/019818, dated Jul. 6, 2021.

(Continued)

*Primary Examiner* — Akwasi M Sarpong
*Assistant Examiner* — Michael L Burleson
(74) *Attorney, Agent, or Firm* — Rimon P.C.

(57) ABSTRACT

A file provision system includes a file generation apparatus and a file relay apparatus. The file generation apparatus includes first circuitry. The first circuitry provides a user terminal with device identification information identifying the file generation apparatus and access destination information indicating an access destination to the file relay apparatus. The first circuitry transmits the device identification information of the file generation apparatus to the file relay apparatus. The file relay apparatus includes second circuitry. The second circuitry receives the device identification information from the user terminal in response to an access from the user terminal. The second circuitry transmits the data file received from the file generation apparatus corresponding to the received device identification information to the user terminal as a source of the access or transfer the data file to a transfer destination designated by the user terminal as the source of the access.

7 Claims, 11 Drawing Sheets

(52) U.S. Cl.
CPC ......... *H04N 1/32106* (2013.01); *H04N 1/444* (2013.01); *H04N 2201/3269* (2013.01); *H04N 2201/3273* (2013.01)

(56) References Cited

U.S. PATENT DOCUMENTS

| | | | | |
|---|---|---|---|---|
| 2015/0268894 | A1* | 9/2015 | Saito | G06F 3/1206 |
| | | | | 358/1.16 |
| 2016/0112422 | A1* | 4/2016 | Watanabe | H04L 63/0838 |
| | | | | 726/28 |
| 2016/0277401 | A1* | 9/2016 | Yamada | G06F 21/6218 |
| 2018/0067707 | A1* | 3/2018 | Fukushima | G06F 3/121 |
| 2018/0359375 | A1 | 12/2018 | Seo | |
| 2019/0089864 | A1 | 3/2019 | Nakabayashi | |
| 2020/0288024 | A1 | 9/2020 | Yamaguchi | |

FOREIGN PATENT DOCUMENTS

| | | |
|---|---|---|
| JP | 2005-129976 A | 5/2005 |
| JP | 2014-007483 A | 1/2014 |
| JP | 2018-206201 A | 12/2018 |
| JP | 2019-53632 A | 4/2019 |
| JP | 2019-192016 A | 10/2019 |
| JP | 2020-044769 A | 3/2020 |
| JP | 2020-145493 A | 9/2020 |
| JP | 2021-077948 A | 5/2021 |
| JP | 2022-045185 A | 3/2022 |

OTHER PUBLICATIONS

Office Action received in corresponding Japanese Patent Application No. 2023-523764, dated Jul. 23, 2024, w/ English Translation.

* cited by examiner

| MANAGEMENT TABLE | | | |
|---|---|---|---|
| SCANNER A | PASSWORD 01 | SETTING INFORMATION 01 | DELETED |
| SCANNER A | PASSWORD 02 | SETTING INFORMATION 02 | OCCUPIED |
| ... | ... | ... | ... |

OVERALL SEQUENCE (S10)

OPERATION BY SERVER (S30)

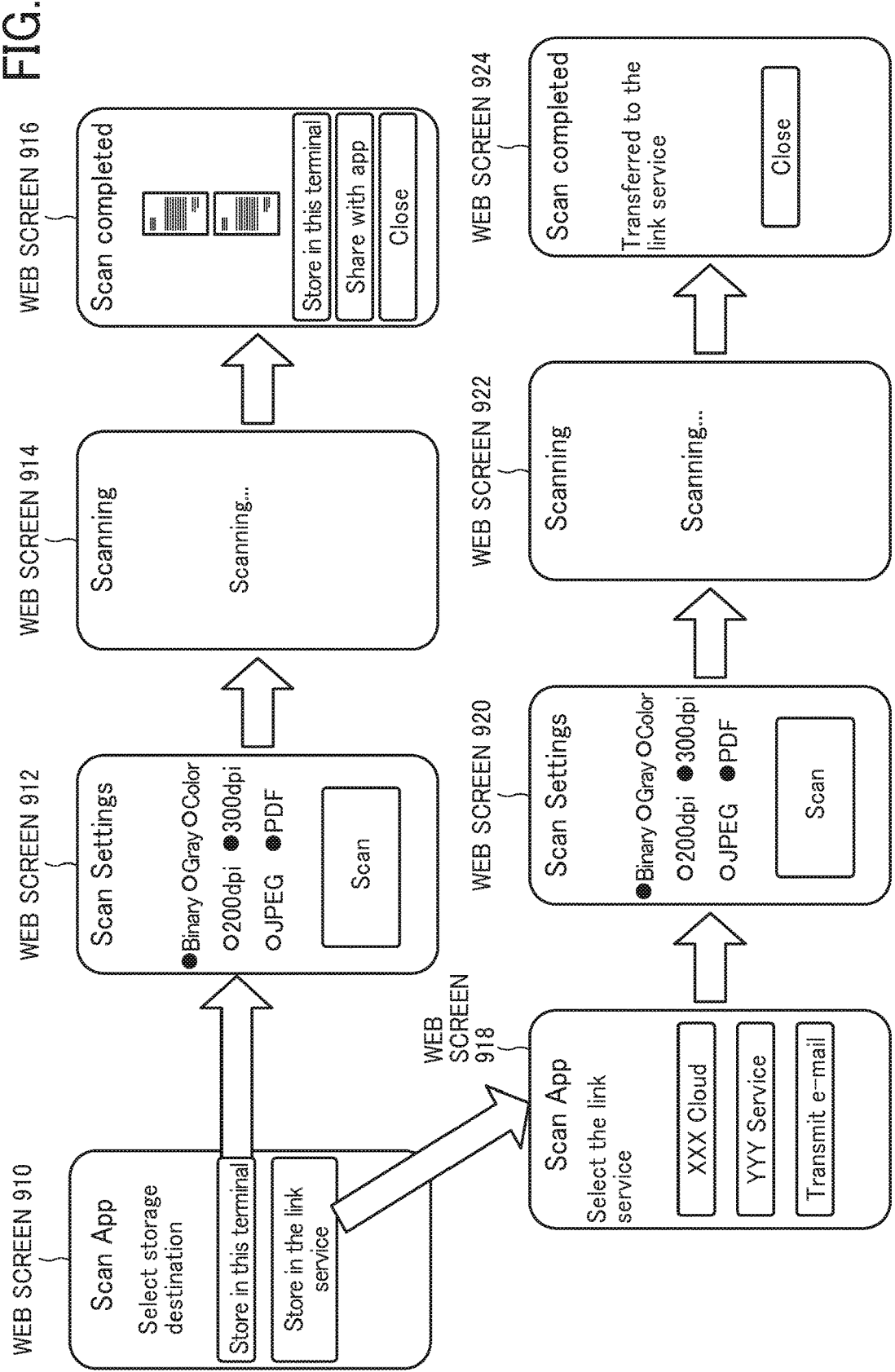

FILE PROVISION SYSTEM, FILE GENERATION APPARATUS, AND FILE PROVISION METHOD

CROSS-REFERENCE TO RELATED APPLICATION

This patent application is based on and claims priority pursuant to 35 U.S.C. § 119(a) to Japanese Patent Application No. 2022-90077, filed on Jun. 2, 2022, in the Japan Patent Office, the entire disclosure of which is hereby incorporated by reference herein.

BACKGROUND

Technical Field

The present disclosure relates to a file provision system, a file generation apparatus, and a file provision method.

Related Art

For example, an image processing apparatus is known that includes a scanner and manages a storage. The image processing apparatus includes setting means for creating and setting a temporary permission for accessing a storage location created in the storage. The image processing apparatus includes code providing means for providing a code corresponding to a page for accessing the storage location with the created permission. The image processing apparatus includes storage means for storing data obtained by scanning with the scanner in the storage location in response to an input according to a user's operation. In the image processing apparatus, transmission of the data stored in the storage location is performed according to an input to the page accessed using the code, and the stored data is deleted after the transmission is performed.

SUMMARY

According to an embodiment of the present disclosure, a file provision system includes a file generation apparatus that generates a data file and a file relay apparatus that relays the data file. The file generation apparatus includes first circuitry. The first circuitry provides a user terminal with device identification information identifying the file generation apparatus and access destination information indicating an access destination to the file relay apparatus. The first circuitry transmits the device identification information of the file generation apparatus to the file relay apparatus. The file relay apparatus includes second circuitry. The second circuitry receives the device identification information of the file generation apparatus from the user terminal in response to an access from the user terminal. The second circuitry transmits the data file received from the file generation apparatus corresponding to the received device identification information to the user terminal as a source of the access or transfer the data file to a transfer destination designated by the user terminal as the source of the access.

According to an embodiment of the present disclosure, a file generation apparatus includes circuitry. The circuitry provides a user terminal with device identification information identifying the file generation apparatus and access destination information indicating an access destination to a file relay apparatus that relays a data file generated by the file generation apparatus. The circuitry transmits the device identification information of the file generation apparatus to the file relay apparatus.

According to an embodiment of the present disclosure, a file generation method is performed by a file generation apparatus. The method includes providing a user terminal with device identification information identifying the file generation apparatus and access destination information indicating an access destination to a file relay apparatus that relays a data file generated by the file generation apparatus. The method includes transmitting the device identification information of the file generation apparatus to the file relay apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 12 is an illustration of examples of web screens displayed on a user terminal, according to an embodiment of the present disclosure.

Figure 1:
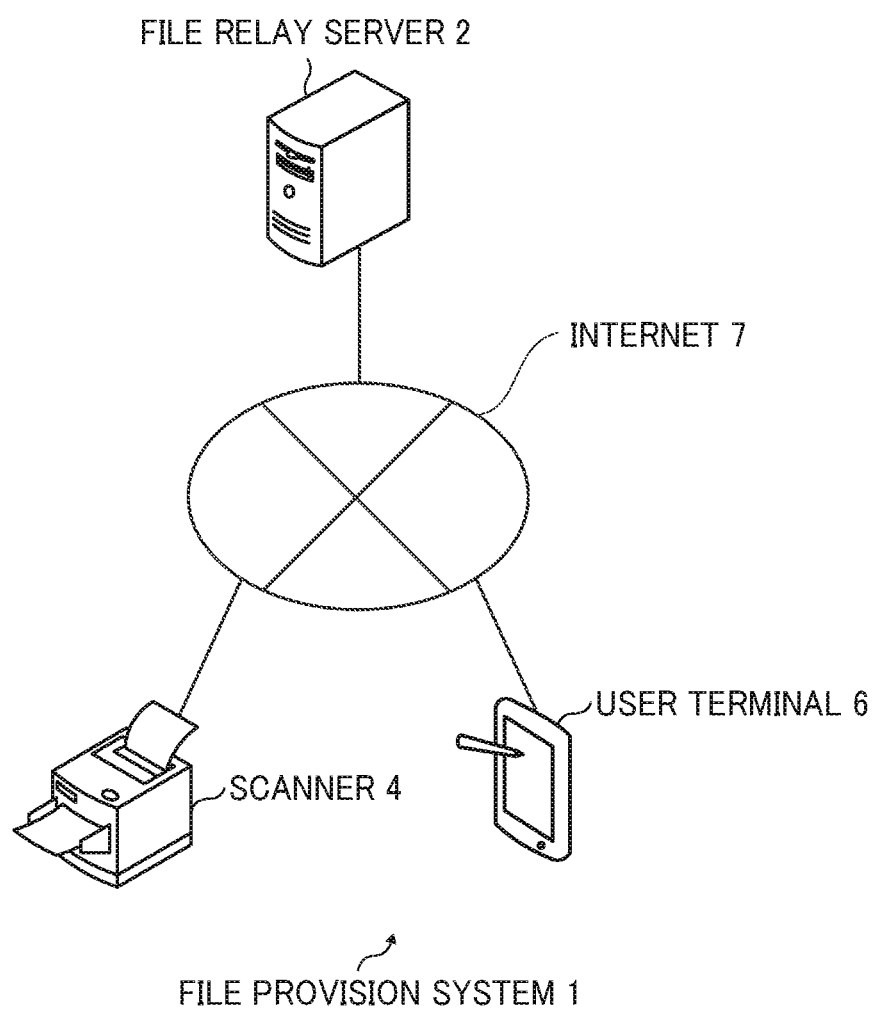
FIG. 1 is a diagram illustrating an example of an overall configuration of a file provision system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, a description is given of the background of the present disclosure.

File generation apparatuses such as scanners are not apparatuses that anyone can use easily, unlike printers or multifunction peripherals (copiers) provided in convenience stores or shared offices. For this reason, the file generation apparatuses such as scanners have not been so widely used in public spaces where an unspecified number of people gather.

Typical cases of using a scanner includes a basic case in which the scanner is used as being connected to a personal computer (PC) with a universal serial bus (USB) cable and a case in which the scanner is used as being connected to a PC or a smartphone in a local area network (LAN) via a wireless LAN (e.g., Wi-Fi). In the following description, the PC or the smartphone is referred to as "PC, etc."

However, these usages are difficult operations for users who use the scanner for the first time and are not familiar with electronic devices.

The following is two reasons for the above difficulty.
(1) Complexity of Software Installation and Initial Settings A user has to install software such as a scanner driver and an application in the PC, etc.

In the initial settings of the scanner, technical terms often appear. This makes it difficult for the user to proceed with the initial settings intuitively.
(2) Efforts of Connection (USB Cable Connection or Network Connection) to Control Device For the case of USB cable connection, a user who has grown up with smartphones may be unfamiliar with handling USB devices.

For the case of network connection, a user has to switch the PC, etc. to the same network as the scanner, and the procedure is complicated. Further, inexperienced users may not know how to switch networks in the first place.

In other words, there is a disadvantage that since advance preparation is required, even if a user wants to use the scanner, etc. at once, the scanner, etc. is not in a state in which the user can use the scanner, etc. immediately, and even if the user starts preparation, some users need to do unfamiliar work such as cable connection or wireless setting.

Hereinafter, a description is given of embodiments of the present disclosure with reference to the drawings.

FIG. 1 is a diagram illustrating an example of an overall configuration of a file provision system 1.

As illustrated in FIG. 1, the file provision system 1 includes a file relay server 2, a scanner 4, and a user terminal 6. The scanner 4 and the user terminal 6 are connected to the file relay server 2 through the Internet 7.

The file relay server 2 is a server apparatus. The file relay server 2 controls the scanner 4 in response to a request from the user terminal 6, and transmits a data file generated by the scanner 4 to the user terminal 6 or transfers the data file to a transfer destination designated by the user terminal 6.

The scanner 4 is an image reading apparatus that optically scans an image from a document. The scanner 4 may be directly connected to the Internet 7 by Wi-Fi. Alternatively, the scanner 4 may be connected to the Internet 7 via a computer terminal. Further, the scanner 4 may transmit image data itself that is read from the document to the file relay server 2. Alternatively, the scanner 4 may perform data processing such as optical character recognition (OCR) processing on the image data that is read from the document and transmit the processing result (data file) to the file relay server 2.

Examples of the user terminal 6 include a computer terminal such as a tablet terminal or a smartphone. The user terminal 6 accesses the file relay server 2 based on a uniform resource locator (URL) (two-dimensional code) displayed on the scanner 4, and acquires the data file generated by the scanner 4 via the file relay server 2.

Figure 2:
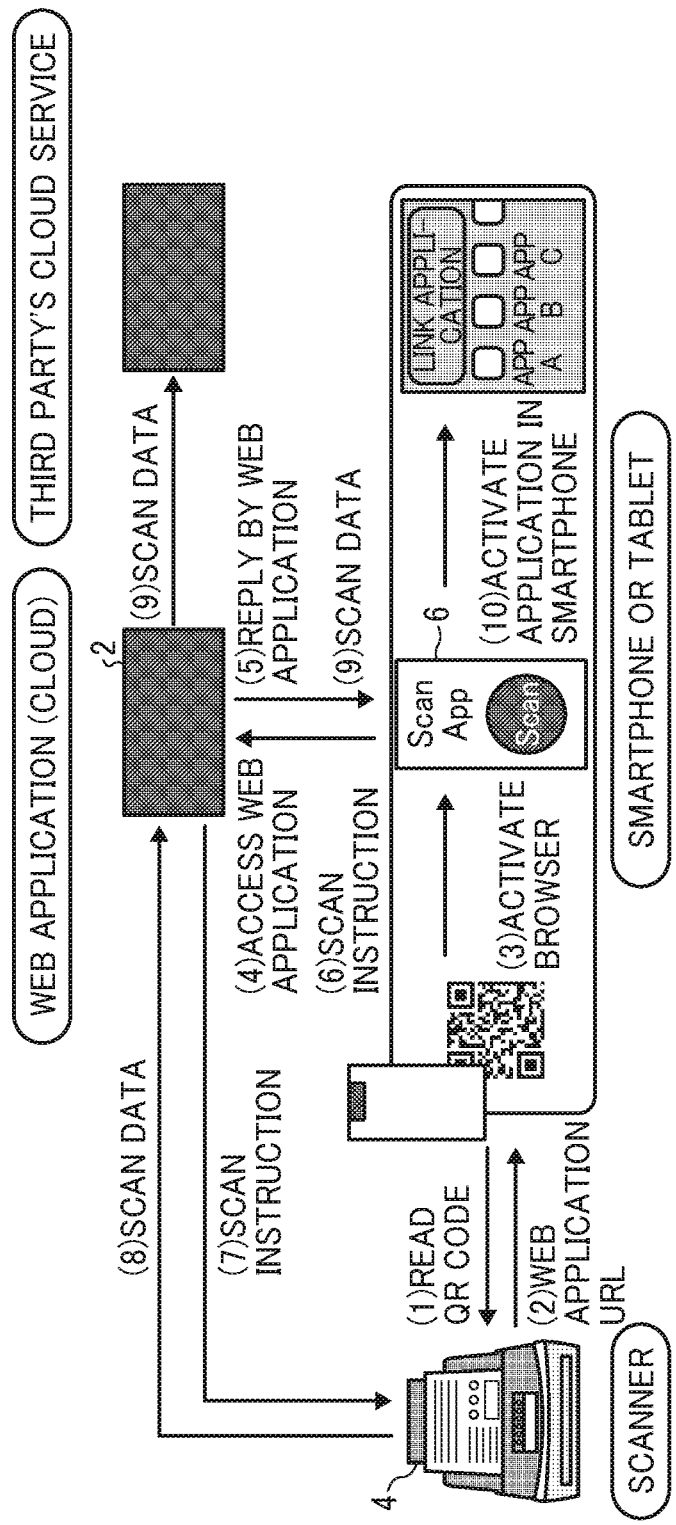
FIG. 2 is a diagram illustrating an example of a flow of data in the file provision system, according to an embodiment of the present disclosure.

In the above-described configuration, as illustrated in FIG. 2, the scanner 4 displays a QR Code® (a two-dimensional code including a web application URL) that dynamically changes for each scan on a touch panel 408 (described below).

The user terminal 6 reads the QR Code® with a camera function of the user terminal 6 according to a user's operation, and connects to a web application (the file relay server 2) with browser software.

The user taps a scan button displayed on a web page of the user terminal 6 (and can also change scan settings).

The scanner 4 performs scanning operation.

The scanner 4 transfers the scan data to the web application (the file relay server 2).

The web application (the file relay server 2) displays the scan data on the web page of the user terminal 6. Alternatively, the web application (the file relay server 2) transfers the scan data to a desired cloud service and deletes the scan data of the web application.

When the scan data is displayed on the web page, the user saves (downloads) the scan data displayed on the web page in the user terminal 6.

When a series of scan processes is completed and an exclusive use state of the scanner 4 is released, the scanner 4 prepares another QR Code® to prepare for the next use.

In other words, according to the file provision system 1, the user can use the scanner 4 just by going in front of the scanner 4 provided in a public space, photographing a QR Code® with his/her smartphone or the like, and thereby causing the smartphone or the like to connect to the web application. The user does not have to install anything and to change the network (Wi-Fi) of the smartphone.

Since the scan data can be transferred to a user's own smartphone or the like (displayed on the web page) or linked to a desired cloud service, the others have no means to access the scan data. Thus, the scan data is secure.

Figure 3:
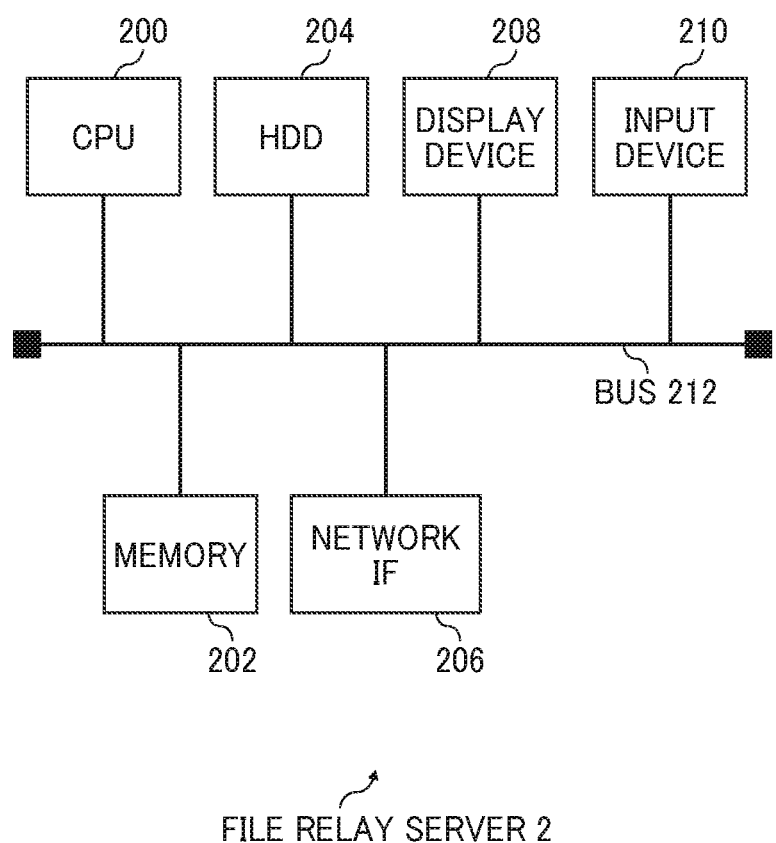
FIG. 3 is a diagram illustrating an example of a hardware configuration of a file relay server, according to an embodiment of the present disclosure.

FIG. 3 is a diagram illustrating an example of a hardware configuration of the file relay server 2.

The file relay server 2 is an example of a file relay apparatus.

As illustrated in FIG. 3, the file relay server 2 includes a CPU 200, a memory 202, an HDD 204, a network interface 206 (network IF 206), a display device 208, and an input device 210. These components are connected to each other via a bus 212.

The CPU 200 is, for example, a central processing unit.

The memory 202 is, for example, a volatile memory and functions as a main storage device.

The HDD 204 is, for example, a hard disk drive device, and stores a computer program (e.g., a server program 3 illustrated in FIG. 5) and other data files as a nonvolatile storage device.

The network IF 206 is an interface for wired or wireless communication, and implements connection to the Internet 7, for example.

The display device 208 is, for example, a liquid crystal display.

The input device 210 is, for example, a keyboard and a mouse.

Figure 4:
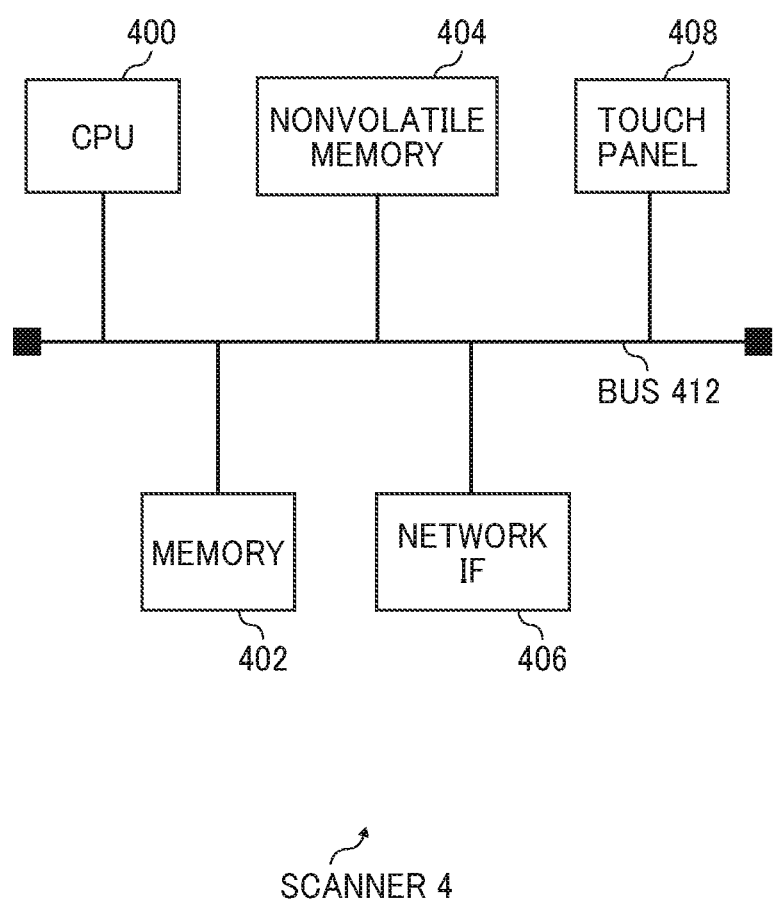
FIG. 4 is a diagram mainly illustrating an example of a hardware configuration of a control section of a scanner, according to an embodiment of the present disclosure.

FIG. 4 is a diagram mainly illustrating an example of a hardware configuration of a control section of the scanner 4.

The scanner 4 is an example of a file generation apparatus according to the present disclosure.

As illustrated in FIG. 4, the scanner 4 includes a CPU 400, a memory 402, which is volatile, a nonvolatile memory 404, a network interface 406 (network IF 406), and the touch panel 408. These components are connected to each other via a bus 412.

The CPU 400 is, for example, a central processing unit.

The memory 402 is, for example, a volatile memory and functions as a main storage device.

The nonvolatile memory 404 stores, for example, a computer program (e.g., a scanner program 5 illustrated in FIG. 6) and other data files as a nonvolatile storage device.

The network IF 406 is an interface for wired or wireless communication.

The touch panel 408 is, for example, a liquid crystal touch panel.

Figure 5:
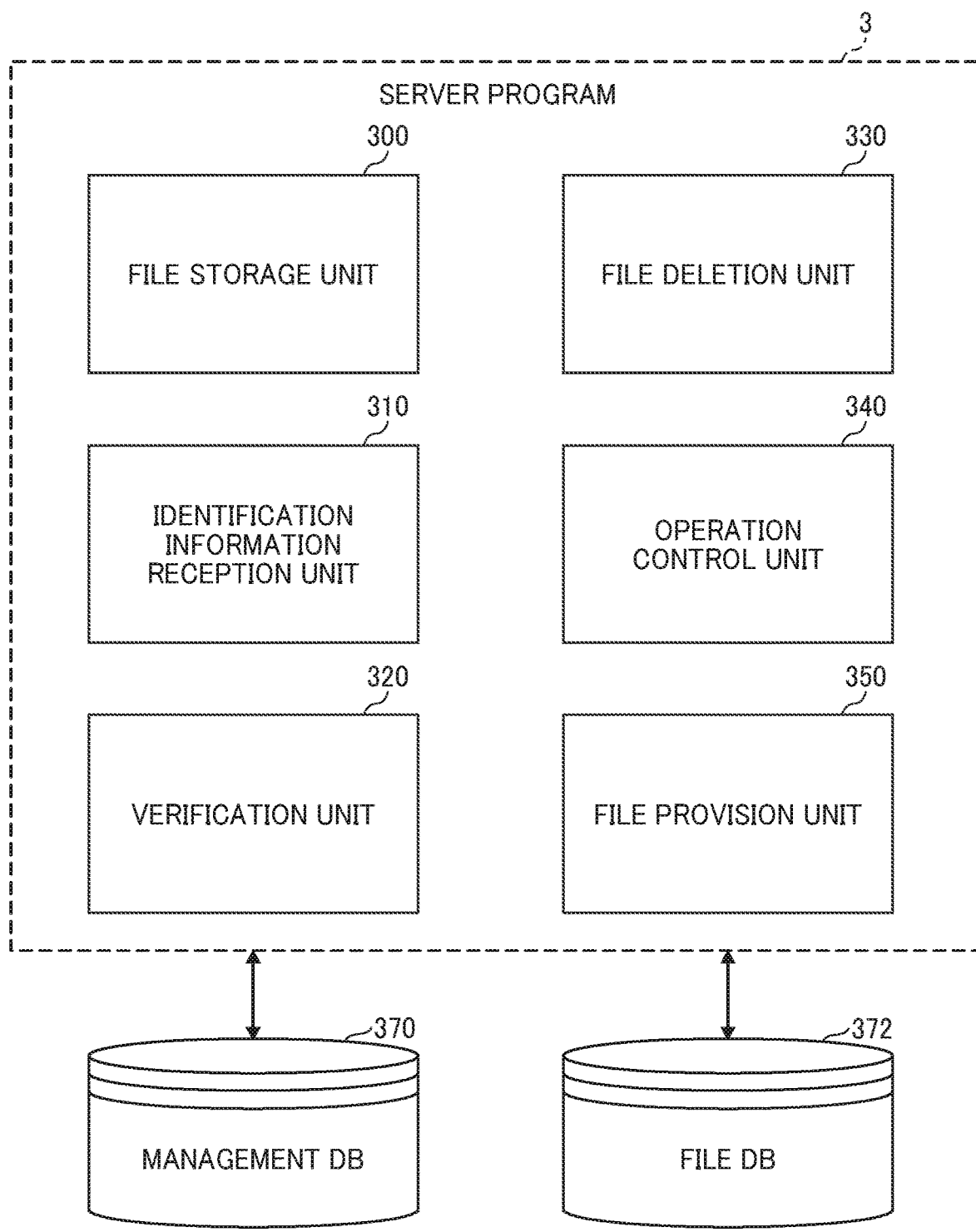
FIG. 5 is a diagram illustrating an example of a functional configuration of the file relay server, according to an embodiment of the present disclosure.

FIG. 5 is a diagram illustrating an example of a functional configuration of the file relay server 2.

As illustrated in FIG. 5, the file relay server 2 of the present example is installed with a server program 3 and the server program 3 operates in the file relay server 2. Further, in the file relay server 2 of the present example, a management database 370 (management DB 370) and a file database 372 (file DB 372) are constructed. The server program 3 is stored in a storage medium such as a compact disc read-only memory (CD-ROM), and is installed in the file relay server 2 via the storage medium.

The server program 3 includes a file storage unit 300, an identification information reception unit 310, a verification unit 320, a file deletion unit 330, an operation control unit 340, and a file provision unit 350.

A part or all of the server program 3 may be implemented by hardware such as an application specific integrated circuit (ASIC) or may be implemented by borrowing a part of functions of an operating system (OS).

In the server program 3, the file storage unit 300 stores a data file received from the scanner 4 in a predetermined storage location. The file storage unit 300 of the present example stores the data file received from the scanner 4 in a storage area (temporary storage location) determined by a URL generation unit in the file DB 372.

The identification information reception unit 310 receives device identification information of the scanner 4 from the user terminal 6 when accessed by the user terminal 6. When the user terminal 6 accesses the file relay server 2 on the basis of a two-dimensional code, the identification information reception unit 310 of the present example receives the device identification information of the scanner 4 and a one-time password included in the two-dimensional code from the user terminal 6.

The verification unit 320 compares the device identification information and the one-time password received by the identification information reception unit 310 with the device identification information and the one-time password transmitted from the scanner 4. The verification unit 320 of the present example compares the device identification information and the one-time password received by the identification information reception unit 310 with the device identification information and the one-time password transmitted from the scanner 4, and permits control of the scanner 4 via the operation control unit 340 when they match (when verification is successful). Otherwise, the verification unit 320 does not permit control of the scanner 4 via the operation control unit 340.

The file deletion unit 330 deletes the data file from the temporary storage location after transmission of the data file to the user terminal 6 or transfer of the data file to a transfer destination designated by the user terminal 6 is completed.

When accessed from the user terminal 6, the operation control unit 340 causes the user terminal 6 to display an operation screen that receives a start operation of scan processing (file generation processing). Further, the operation control unit 340 causes the scanner 4 corresponding to the device identification information received by the identification information reception unit 310 to perform the file generation processing in response to a user's operation on the operation screen. The operation control unit 340 of the present example causes the user terminal 6 to display the operation screen that receives the start operation of the scan processing when the verification by the verification unit 320 is successful, and causes the scanner 4 to perform the scan processing according to a user's operation on the operation screen.

The file provision unit 350 transmits the data file received from the scanner 4 corresponding to the device identification information received by the identification information reception unit 310 to the user terminal 6 as an access source or transfers the data file to a transfer destination designated by the user terminal 6 as an access source. The file provision unit 350 of the present example transmits scan data obtained by scanning by the scanner 4 under control of the operation control unit 340 to the user terminal 6 or a transfer destination according to setting information when verification by the verification unit 320 is successful.

Figures 6, 7:
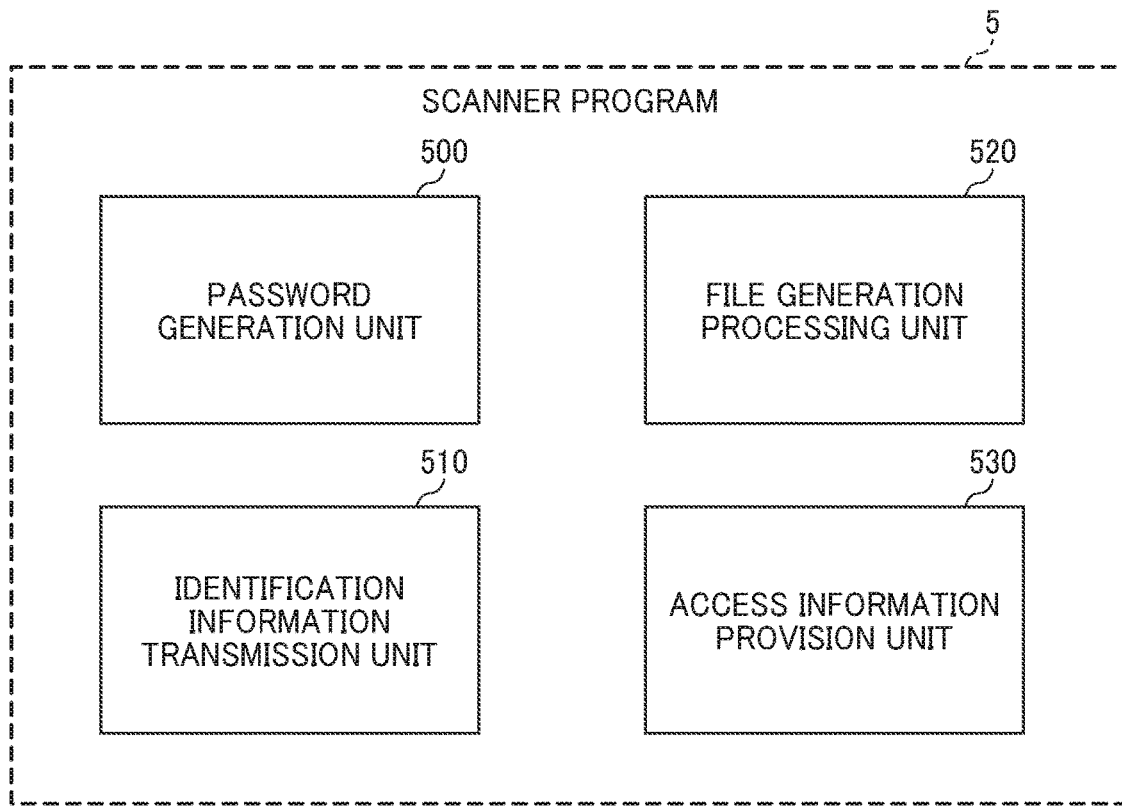
FIG. 6 is a diagram illustrating an example of a functional configuration of the scanner, according to an embodiment of the present disclosure.
FIG. 7 is a diagram illustrating an example of information registered in a management database, according to an embodiment of the present disclosure.

The management DB 370 stores information for managing a session between the user terminal 6 and the file relay server 2. For example, as illustrated in FIG. 7, the management DB 370 is in the form of a management table in which the one-time password (e.g., "password 01") received from the scanner 4, the setting information (scan settings and a transfer destination) that is input from the user terminal 6 after authentication by the one-time password, and a status of a session are registered in association with the device identification information ("scanner A") received from the scanner 4. The status of the session includes "deleted" for a session that has ended because the scan data is deleted after the session and "occupied" for a session that is in progress because the scanner 4 is used exclusively when the session is in progress.

The file DB 372 stores the data file received from the scanner 4.

FIG. 6 is a diagram illustrating an example of a functional configuration of the scanner 4.

As illustrated in FIG. 6, the scanner 4 of the present example is installed with a scanner program 5 and the installed scanner program 5 operates in the scanner 4. Although the scanner program 5 of this example is installed in the scanner 4 in advance, this is just an example. Alternatively, the scanner program 5 may be stored in a storage medium such as a CD-ROM, and is installed in the scanner 4 via the storage medium.

The scanner program 5 includes a password generation unit 500, an identification information transmission unit 510, a file generation processing unit 520, and an access information provision unit 530.

A part or all of the scanner program 5 may be implemented by hardware such as an ASIC or may be implemented by borrowing a part of functions of an operating system (OS).

In the scanner program 5, the password generation unit 500 generates a one-time password for each file generation processing. The password generation unit 500 of the present example generates the one-time password when the scanner 4 is started. When a session based on the latest one-time password ends, the password generation unit 500 generates a new one-time password for the next session.

The identification information transmission unit 510 transmits the device identification information of the scanner 4 (file generation apparatus) to the file relay server 2. The identification information transmission unit 510 of the present example transmits, to the file relay server 2, the device identification information of the scanner 4 (itself) and the one-time password generated by the password generation unit 500 in response to generation of the one-time password by the password generation unit 500.

The file generation processing unit 520 generates a data file according to an instruction from the file relay server 2 and transmits the generated data file to the file relay server 2. The file generation processing unit 520 of the present example performs scan processing in response to an instruction from the operation control unit 340, and transmits the generated scan data to the file relay server 2.

The access information provision unit 530 provides the user terminal 6 with the device identification information that identifies the scanner 4 and access destination information indicating an access destination to the file relay server 2. More specifically, the access information provision unit 530 generates a two-dimensional code including the device identification information of the scanner 4 and a URL of the file relay server 2, and displays the generated two-dimensional code on the touch panel 408 to provide the user terminal 6 with the device identification information and the URL. The access information provision unit 530 of the present example generates a QR Code® including the device identification information of the scanner 4, the URL of the file relay server 2, and the one-time password generated by the password generation unit 500, and displays the generated QR Code® on the touch panel 408.

Figure 8:
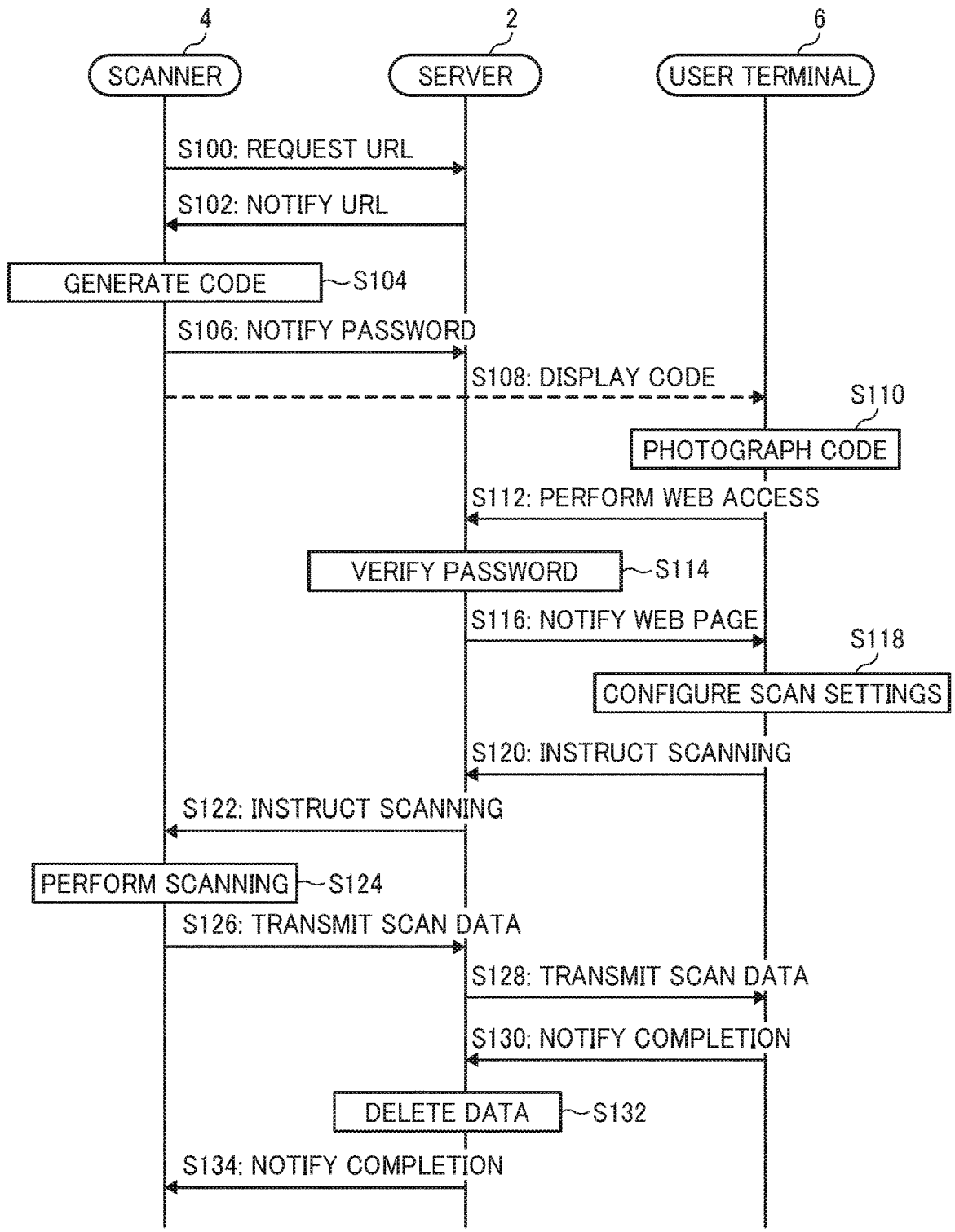
FIG. 8 is a sequence diagram illustrating an overall operation performed by the file provision system, according to an embodiment of the present disclosure.

FIG. 8 is a sequence diagram illustrating an overall operation (S10) performed by the file provision system 1.

Figure 9:
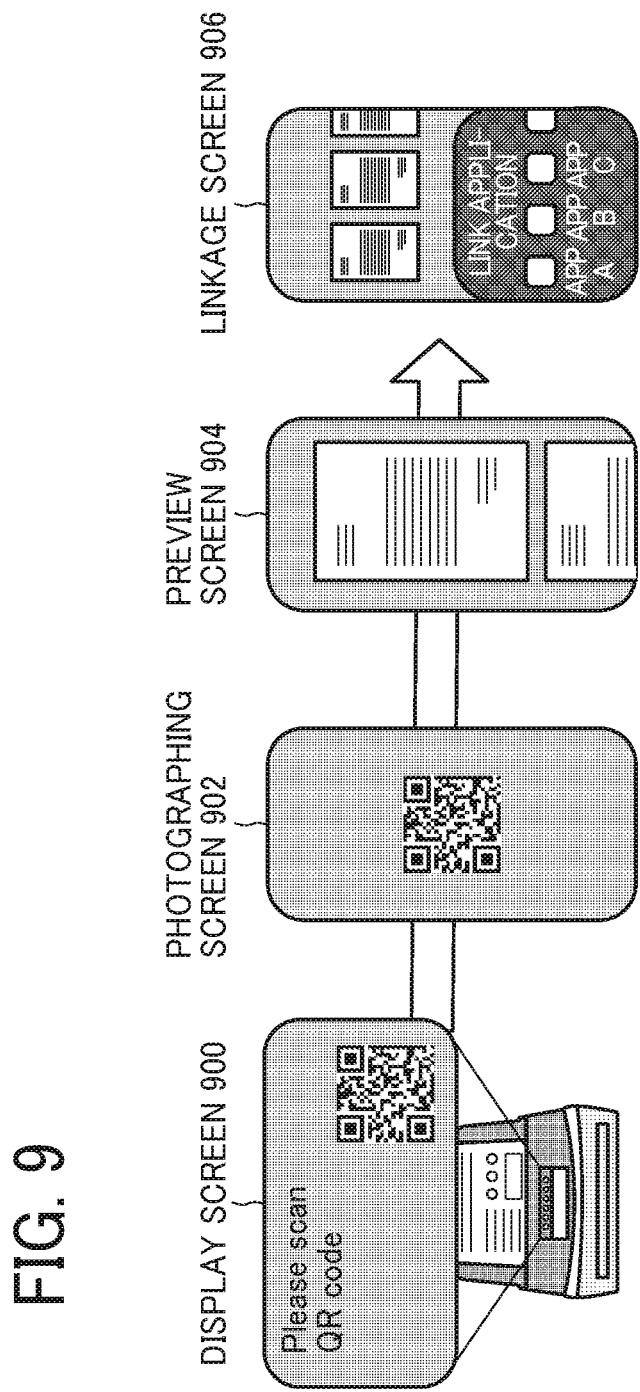
FIG. 9 is an illustration of examples of screens displayed in the overall operation of FIG. 8.

FIG. 9 is an illustration of examples of screens displayed in the overall operation of FIG. 8.

As illustrated in FIG. 8, in step 100 (S100), when the scanner 4 starts up, the scanner 4 accesses the file relay server 2 and requests a URL of the file relay server 2.

In step 102 (S102), the file relay server 2 notifies the scanner 4 of a URL of a temporary storage area allocated to the scanner 4.

In step 104 (S104), the scanner 4 generates a one-time password, and generates a two-dimensional code including the generated one-time password, the URL notified from the file relay server 2, and the device identification information of the scanner 4 itself.

In step 106 (S106), the scanner 4 notifies the file relay server 2 of the generated one-time password and the device identification information of the scanner 4 itself.

In step 108 (S108), the scanner 4 displays the generated two-dimensional code on the touch panel 408. As illustrated in FIG. 9, the two-dimensional code generated by the scanner 4 is displayed on a display screen 900 displayed on the touch panel 408.

In step 110 (S110), the user terminal 6 reads the two-dimensional code displayed on the touch panel 408 of the scanner 4 according to a user's photographing operation on a photographing screen 902 illustrated in FIG. 9.

In step 112 (S112), the user terminal 6 performs web access to the file relay server 2 on the basis of the read two-dimensional code. At the time of the web access, the user terminal 6 transmits the device identification information and the one-time password included in the two-dimensional code to the file relay server 2.

In step 114 (S114), the file relay server 2 searches sets of the device identification information and the one-time password received from the scanner 4 for a set that matches the device identification information and the one-time password received from the user terminal 6, and determines that verification is successful when there is a valid matching set. By contrast, when there is no valid matching set, the file relay server 2 determines that verification fails. When the verification is successful, the scanner 4 is used exclusively by the user terminal 6.

In step 116 (S116), when the verification is successful, the file relay server 2 causes the user terminal 6 to display a web page that allows the user to operate the scanner 4.

In step 118 (S118), the user terminal 6 configures settings for scan processing on the web page provided by the file relay server 2.

In step 120 (S120), when the user performs a scan start operation on the web page provided by the file relay server 2, the user terminal 6 transmits a scan processing start instruction and setting information to the file relay server 2.

In step 122 (S122), the file relay server 2 instructs the scanner 4 to start scan processing based on the received setting information according to the setting information and the start instruction received from the user terminal 6.

In step 124 (S124), the scanner 4 performs scan processing according to the setting information and the scan start instruction from the file relay server 2.

In step 126 (S126), the scanner 4 transmits a data file (scan data) generated by the scanning processing to the file relay server 2.

In step 128 (S128), the file relay server 2 transmits the scan data received from the scanner 4 to the user terminal 6.

In step 130 (S130), the user terminal 6 displays the scan data received from the file relay server 2 on a preview screen 904 (FIG. 9), and when there is no issue to be addressed, the user terminal 6 stores the scan data in the user terminal 6 and notifies the file relay server 2 of the completion of the scan processing. Alternatively, the user terminal 6 may select, according to a user's operation on a link screen 906 illustrated in FIG. 9, a web service with which a data link is to be performed and cause the file relay server 2 to transfer the scan data to the selected web service.

In step 132 (S132), the file relay server 2 deletes the scan data in response to receiving the notification of the completion of the scanning processing from the user terminal 6.

In step 134 (S134), the file relay server 2 notifies the scanner 4 that the exclusive use state is canceled.

Figure 10:
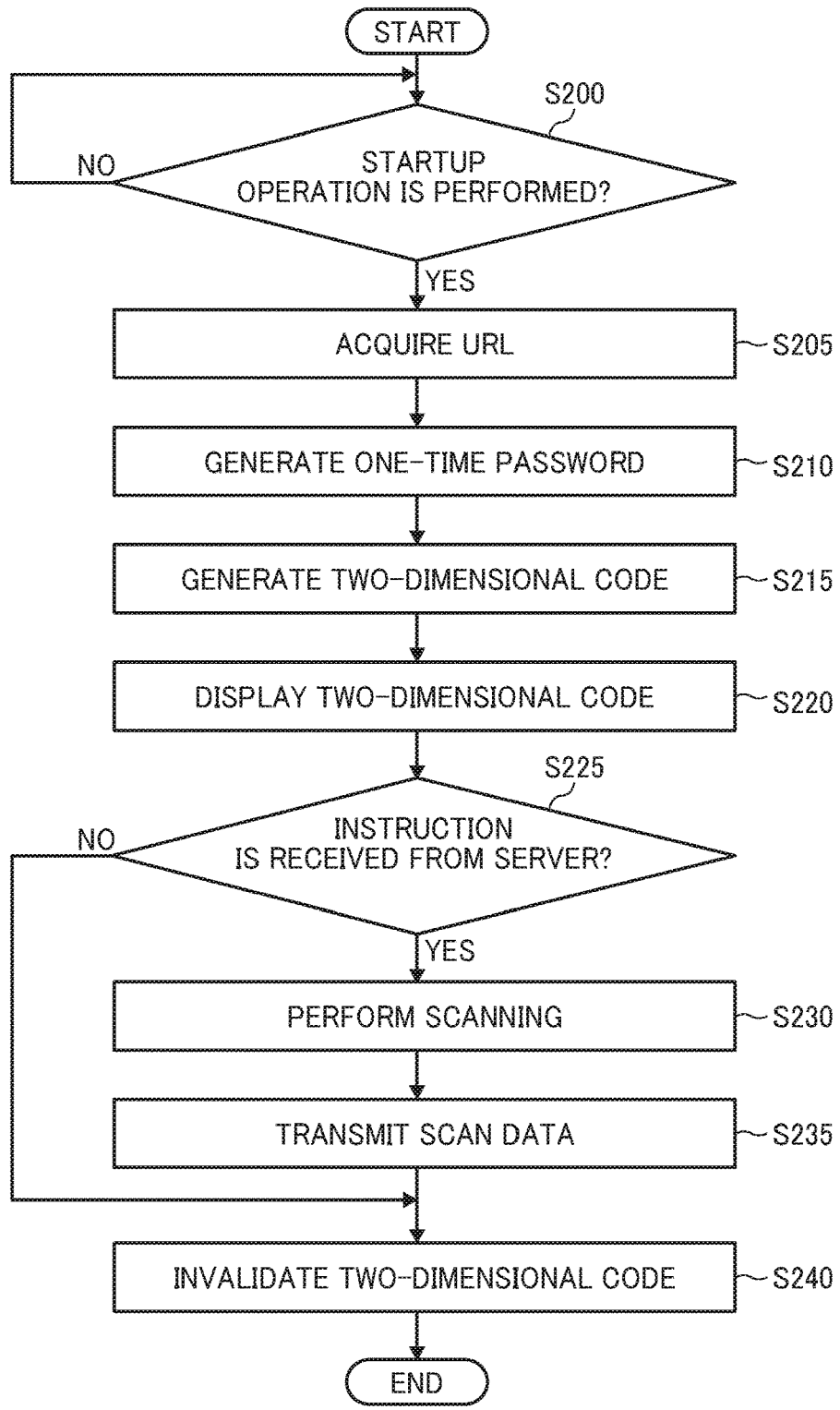
FIG. 10 is a flowchart for describing an operation performed by the scanner of the file provision system in more detail, according to an embodiment of the present disclosure.

FIG. 10 is a flowchart for describing an operation (S20) performed by the scanner 4 of the file provision system 1 in more detail.

As illustrated in FIG. 10, in step 200 (S200), when the scanner 4 is turned on and a startup operation is performed (S200: Yes), the operation proceeds to a process of S205. The scanner 4 continues to wait until the startup operation is performed (S200: No).

In step 205 (S205), the scanner 4 acquires the URL from the file relay server 2. A part or all of the URL may be stored in the scanner 4 in advance.

In step 210 (S210), the password generation unit 500 (FIG. 6) of the scanner 4 generates a one-time password, and the identification information transmission unit 510 notifies the file relay server 2 of the generated one-time password and the device identification information of the scanner 4 itself.

In step 215 (S215), the access information provision unit 530 generates a two-dimensional code including the one-time password generated by the password generation unit 500, the URL acquired from the file relay server 2, and the device identification information of the scanner 4 itself.

In step 220 (S220), the access information provision unit 530 displays the generated two-dimensional code on the touch panel 408.

In step 225 (S225), the file generation processing unit 520 waits for a scan start instruction from the file relay server 2, and the operation proceeds to a process of S230 when a scan start instruction is received from the file relay server 2. The operation proceeds to a process of S240 when no scan start instruction is received within a certain period of time.

In step 230 (S230), the file generation processing unit 520 performs scan processing according to the instruction (including the setting information) from the file relay server 2. In step 235 (S235), the file generation processing unit 520 transmits scan data generated by the scan processing to the file relay server 2.

In step 240 (S240), in response to receiving a completion notification from the file relay server 2 or in response to timeout, the password generation unit 500 invalidates the generated one-time password and cancels the exclusive use state.

Figure 11:
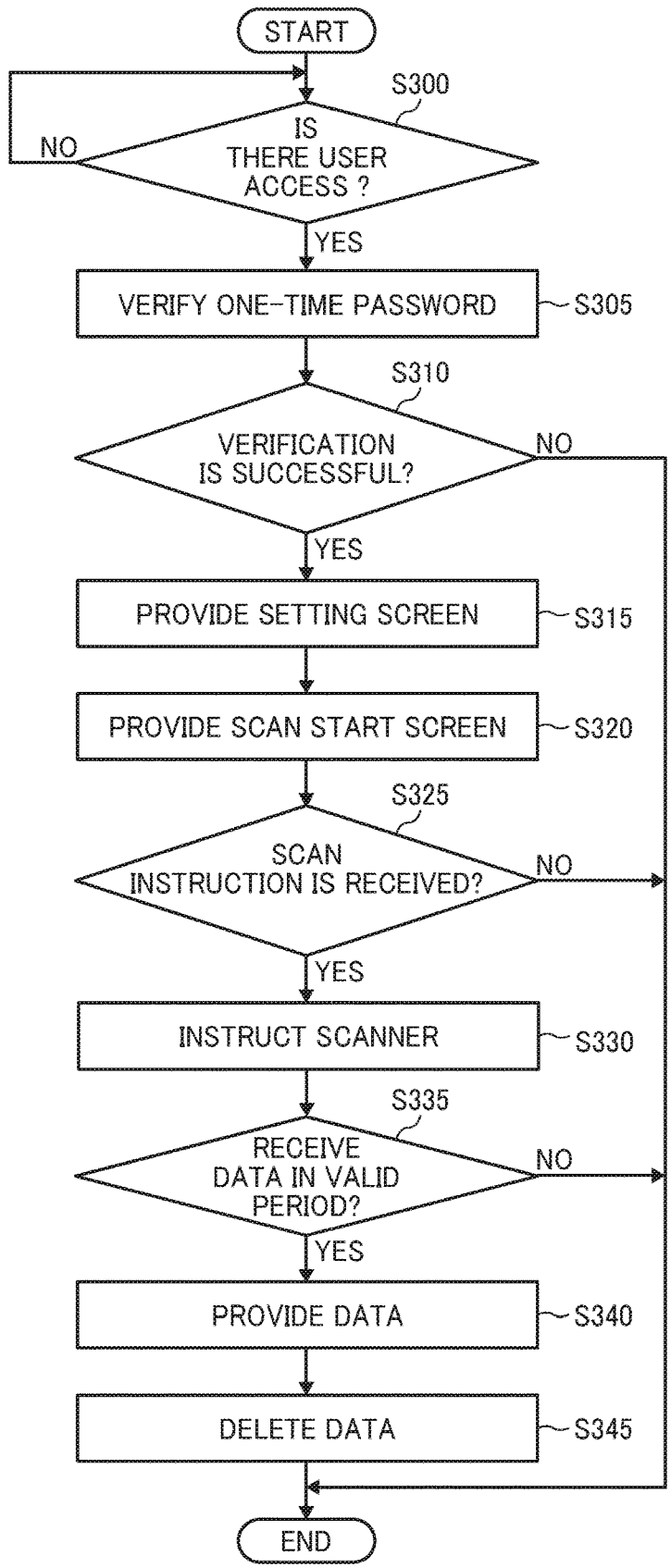
FIG. 11 is a flowchart for describing an operation performed by the file relay server of the file provision system in more detail, according to an embodiment of the present disclosure.

FIG. 11 is a flowchart for describing an operation (S30) performed by the file relay server 2 of the file provision system 1 in more detail.

As illustrated in FIG. 11, in step 300 (S300), the file relay server 2 (the server program 3) waits until there is a web access from the user terminal 6 (S300: No). In response to a web access from the user terminal 6 (S300: Yes), the operation proceeds to a process of S305.

In step 305 (S305), when the user terminal 6 accesses the file relay server 2 according to the two-dimensional code, the identification information reception unit 310 (FIG. of the file relay server 2 receives the device identification information of the scanner 4 and the one-time password included in the two-dimensional code from the user terminal 6. The verification unit 320 compares the device identification information and the one-time password received by the identification information reception unit 310 with the device identification information and the one-time password transmitted in advance from the scanner 4, to search the management DB 370 for a matching set.

In step 310 (S310), when the verification unit 320 finds the matching set in the management DB 370, the server program 3 proceeds to a process of S315. When the verification unit 320 finds no matching set, the server program 3 ends the operation (S30) by the file relay server 2. The scanner 4 corresponding to the device identification information included in the matching set is an object to be controlled by the operation control unit 340.

In step 315 (S315), the operation control unit 340 causes the user terminal 6 to display a setting screen for configuring settings of the scanner 4 to be controlled, and receives a user's setting operation.

Specifically, first, a web screen 910 illustrated in FIG. 12 is displayed prompting a user to select whether the transfer destination of the scan data is the user terminal 6 or a link service. When the user terminal 6 is selected as the transfer destination of the scan data, a web screen 912 is displayed enabling to configure settings of the scan processing. By contrast, when the link service is selected as the transfer destination of the scan data, a web screen 918 is displayed enabling to select a link destination service. When the link service is selected, a web screen 920 for configuring the settings of the scan processing is displayed.

In step 320 (S320), the operation control unit 340 displays a screen (the web screen 912 or the web screen 920) that receives a scan start operation, to receive a user's scan start operation.

In step 325 (S325), when the operation control unit 340 receives the scan start operation by the user on the screen (the web screen 912 or the web screen 920) that receives a scan start operation, the server program 3 proceeds to a process of S330. When no scan start operation by the user is performed within a certain period of time, the operation (S30) by the file relay server 2 ends.

In step 330 (S330), the operation control unit 340 instructs the scanner 4 to start the scan processing together with the setting information that is input by the user and causes the user terminal 6 to display a web screen 914 or a web screen 922.

In step 335 (S335), the server program 3 waits until the scan data is transmitted from the scanner 4, and when the scan data is received within a valid period of time, the server program 3 proceeds to a process of S340. When no scan data is received within the valid period of time, the operation (S30) by the file relay server 2 ends.

In step 340 (S340), the file provision unit 350 transfers the scan data received from the scanner 4 to the user terminal 6 or the link destination service according to the user's selection on the web screen 910 or the web screen 918. When the scan data is to be transferred to the user terminal 6, a preview is displayed on a web screen 916 enabling to select a final storage destination. Further, when the scan data is to be transferred to the link destination service, a web screen 924 indicating completion of the transfer is displayed after the transfer is completed.

In step 345 (S345), the file deletion unit 330 deletes the stored scan data from the file DB 372 after confirming that the transfer of the scan data is successful, and updates the corresponding status in the management DB 370 to "deleted."

As described above, according to the file provision system 1 of the present embodiment, just by reading a two-dimensional code displayed on the scanner 4 by the user terminal 6, the user terminal 6 can access the file relay server 2 and set the scanner 4 to the exclusive use state to control the scanner 4. In other words, scanning can be completed only with the user terminal 6 (such as a smartphone) held by the user without installing software, configuring initial settings of software, switching networks, or creating or registering an account by a user.

Further, by updating a one-time password in units of scan processing, the one-time password serves as a secret code even when a plurality of users share the scanner 4.

Further, according to the file provision system 1 of the present embodiment, since scan data is deleted from the file relay server 2 after transfer of the scan data, the risk of data leakage is reduced.

According to one or more embodiments of the present disclosure, a file generation apparatus is appropriately shared with a simple procedure.

In the above description, embodiments of the present disclosure and the modifications of those embodiments of the present disclosure are described. However, the description of the above embodiments and the modifications of those embodiments is given by way of example, and is not intended to limit the scope of the present disclosure. The above-described embodiments can be implemented in a variety of other forms. Various omissions, substitutions, and changes in the above-described embodiments may be made without departing from the spirit of the present disclosure. In addition, the above-described embodiments and modifications thereof are included in the scope and the spirit of the present disclosure, and also included in the invention described in the claims and the equivalent thereof.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A file provision system comprising:
a file generation apparatus configured to generate a data file; and
a file relay apparatus configured to receive the data file from the file generation apparatus and transmit the data file to a user terminal based on a verification result,
wherein the file generation apparatus includes first circuitry configured to:
  display information to be scanned by the user terminal, the information including i) a device identification of the file generation apparatus and ii) an access destination of the file relay apparatus; and
  transmit the device identification of the file generation apparatus to the file relay apparatus,
wherein the file relay apparatus includes second circuitry configured to:
  receive, from the user terminal upon the user terminal scanning the displayed information and establishing communication with the file relay apparatus using the access destination included in the displayed information, the device identification of the file generation apparatus;
  verify that the device identification received from the file generation apparatus matches the device identification received from the user terminal; and
  in response to verifying that the device identification received from the file generation apparatus matches the device identification received from the user terminal, transmit the data file received from the file generation apparatus to the user terminal, and
wherein the second circuitry of the file relay apparatus is configured to delete the data file received from the file generation apparatus after the second circuitry of the file relay apparatus transmits the data file to the user terminal.

2. The file provision system of claim 1, wherein the file generation apparatus is an image reading apparatus that optically reads an image from a document.

3. The file provision system of claim 2, wherein the second circuitry of the file relay apparatus is configured to:
  cause the user terminal to display an operation screen that receives a user operation; and
  in response to receiving the user operation on the operation screen of the user terminal, cause the file generation apparatus to perform file generation processing to generate the data file to be transmitted from the file generation apparatus to the file relay apparatus and further transmitted from the file relay apparatus to the user terminal.

4. The file provision system of claim 3, wherein the information displayed by the first circuitry of the file generation apparatus includes a two-dimensional code including the device identification of the file generation apparatus, the access destination of the file relay apparatus, and a one-time password,
the first circuitry of the file generation apparatus is configured to transmit the device identification and the one-time password to the file relay apparatus, and
the second circuitry of the file relay apparatus is configured to:
  receive, from the user terminal upon scanning the two-dimensional code, the device identification and the one-time password;
  verify that i) the device identification and the one-time password received from the user terminal match ii) the device identification and the one-time password received from the first circuitry of the file generation apparatus; and
  in response to verifying that i) the device identification and the one-time password received from the user terminal match ii) the device identification and the one-time password received from the first circuitry of the file generation apparatus, cause the user terminal to display the operation screen that receives the user operation to start the file generation processing.

5. The file provision system of claim 4, wherein the second circuitry of the file relay apparatus is configured to:

in response to verifying that i) the device identification and the one-time password received from the user terminal match ii) the device identification and the one-time password received from the first circuitry of the file generation apparatus, cause the user terminal to display a setting screen for entering settings of the file generation processing or another setting screen for setting a transfer destination of the data file; and after causing the user terminal to display the setting screen or the another setting screen, cause the user terminal to display the operation screen that receives the user operation to start the file generation processing.

6. A file generation apparatus comprising circuitry configured to:

display a two-dimensional code to be scanned by a user terminal, the two-dimensional code including a device identification of the file generation apparatus an access destination of a file relay apparatus, and a one-time password;

transmit the device identification of the file generation apparatus and the one-time password to the file relay apparatus;

generate a data file based on optically reading an image from a document in response to receiving a user operation for performing file generation processing from the user terminal that uses the access destination of the file relay apparatus in the two-dimensional code to establish communication with the file relay apparatus upon the file relay apparatus verifying that i) the device identification and the one-time password received from the user terminal match ii) the device identification and the one-time password received from the circuitry of the file generation apparatus; and transmit the generated data file to the user terminal via the file relay apparatus so that the data file is deleted from the file generation apparatus after the data file is transmitted from the file relay apparatus to the user terminal.

7. A file generation method comprising:

displaying, by a file generation apparatus, an image to be scanned by a user terminal, the image including a device identification of the file generation apparatus, an access destination to a file relay apparatus, and a one-time password;

transmitting, from the file generation apparatus to the file relay apparatus, the device identification of the file generation apparatus and the one-time password;

receiving, at the file relay apparatus from the user terminal in response to the user terminal scanning the displayed image and establishing communication with the file relay apparatus using the access destination included in the displayed image, the device identification of the file generation apparatus and the one-time password;

verifying that i) the device identification and the one-time password received from the user terminal match ii) the device identification and the one-time password received from the file generation apparatus, in response to verifying that i) the device identification and the one-time password received from the user terminal match ii) the device identification and the one-time password received from the file generation apparatus, causing the user terminal to display an operation screen that receives a user operation to start file generation processing;

in response to receiving the user operation on the operation screen of the user terminal, causing the file generation apparatus to perform the file generation processing to generate a data file based on optically reading an image from a document;

transmitting, from the file generation apparatus to the user terminal via the file relay apparatus, the generated data file; and deleting the data file received from the file generation apparatus after the data file is transmitted from the file relay apparatus to the user terminal.

* * * * *